US006626578B1

United States Patent
Goodnick et al.

(10) Patent No.: US 6,626,578 B1
(45) Date of Patent: Sep. 30, 2003

(54) ROTARY PUMP WITH BEARING WEAR INDICATOR

(75) Inventors: Douglas J. Goodnick, Niagara Falls, NY (US); Martin G. Leslie, Lockport, NY (US); Joseph D. Reasinger, Tonawanda, NY (US)

(73) Assignee: Buffalo Pumps, Inc., North Tonawanda, NY (US)

( * ) Notice: Subject to any disclaimer, the term of this patent is extended or adjusted under 35 U.S.C. 154(b) by 44 days.

(21) Appl. No.: 10/094,982

(22) Filed: Mar. 12, 2002

(51) Int. Cl.[7] ............................................... F16C 17/10
(52) U.S. Cl. ...................... 384/446; 384/446; 384/448; 384/624
(58) Field of Search ................................. 384/271, 272, 384/446, 448, 624

(56) References Cited

U.S. PATENT DOCUMENTS

| 3,195,466 A | 7/1965 | Young |
| 3,225,698 A | 12/1965 | Spisiak |
| 3,433,164 A | 3/1969 | Neal |
| 4,237,454 A | 12/1980 | Meyer |
| 5,248,940 A | 9/1993 | Patience et al. |
| 5,336,996 A | 8/1994 | Rusnak |
| 5,696,444 A | 12/1997 | Kipp et al. |
| 5,926,001 A | 7/1999 | Eguchi |
| 5,944,489 A | 8/1999 | Vaughn et al. |
| 5,955,880 A | 9/1999 | Beam et al. |
| 6,107,794 A | 8/2000 | Kipp et al. |
| 6,350,109 B1 | 2/2002 | Brunet |

OTHER PUBLICATIONS

Buffalo Pumps Bulletin 929A *Buffalo Can–O–Matic II—Reliable Zero Leakage Pumps*(no date).
Buffalo Pumps Bulletin 985 C–O–M "R"™ Seal;ess Design—refrigrant Pumps Ammonia R–22 $CO_2$*Brines*(no date).

Primary Examiner—Lenard A Footland
(74) Attorney, Agent, or Firm—Fay, Sharpe, Fagan, Minnich & McKee, LLP

(57) ABSTRACT

A rotary pump for liquid comprising a housing, a shaft carrying a motor rotor, a motor stator fixed in the housing and surrounding the rotary to rotate the rotor and shaft about an axis, where the shaft is mounted in the housing by axially spaced conical bearings each of which includes a first element fixed on the shaft with a first conical bearing surface concentric with the axis and a second journal element carried by the housing with a second conical bearing surface concentric with the axis and slidably engaging the first bearing surface. A biasing element forces the second elements or journal toward each other in an axial direction to compensate for wear between the friction surfaces. A wear indicator comprises a first follower on the housing and movable axially with the second element of the first conical bearing, a second follower on the housing and movable axially with the second element of the second conical bearing with the follower indicator elements spaced from each other a spacing indicative of the total axial movement of the second bearing elements and a view window on the housing for viewing the spacing of the indicator elements.

23 Claims, 5 Drawing Sheets

ROTARY PUMP WITH BEARING WEAR INDICATOR

The present invention relates to a rotary pump for liquid and more particularly to a rotary pump of the immersed rotor type with a bearing wear indicator.

INCORPORATION BY REFERENCE

The present invention is particularly applicable to a liquid rotary pump where the liquid immerses the motor rotor that is isolated from the motor stator by a seal often referred to as a can or jacket. This type of speciality pump has been manufactured for many years and includes a shaft for rotatably mounting the rotor of the motor element of the pump. To center the rotor in the pump housing, it has proven quite beneficial to use a mechanism having axially spaced conical bearings. Such pump and bearings are disclosed in Young U.S. Pat. No. 3,195,466. Conical shaft bearings not only center the rotor and maintain the axial position of the pump impeller, but also provides the friction bearing surfaces between the pump housing and rotating elements within the pump. Young U.S. Pat. No. 3,195,466 is incorporated by reference as background information so that the details of the particular pump and bearings to which the present invention is directed need not be repeated by merely describing known pump technology. Through the years, patents have issued directed toward certain mechanical changes in an immersed rotor type of liquid pump. Two of these patents are Spisiak U.S. Pat. No. 3,225,698 and Neal U.S. Pat. No. 3,433,164. These patents are also incorporated by reference herein as background pump technology that need not be repeated in describing and understanding of the present invention. Recently, anew design for an immersed rotor rotary pump was the subject of Brunet U.S. Pat. No. 6,350,109. This patent replaces the conical bearings with a combination of radial and thrust or axial magnetic bearings whereby the immersed rotor essentially levitates as it rotates. This is a drastic departure from the simple conical bearing construction used over the years and requires substantial electromagnetic controls to maintain the levitation gaps. However, this patent does teach a pump of the type to which the present invention is directed and is incorporated by reference herein as background information and for again showing pump components not involved in the present invention. The rotary pump to which the present invention is directed is an improvement or modification of an existing pump sold by Buffalo Pumps of North Tonawanda, N.Y. The interior design of the preferred embodiment is the same as the pumps marketed by Buffalo Pumps for some years. This well known design is disclosed in Bulletins 929A and 985 which are incorporated by reference herein as background information that shows how the pump to which the present invention is directed complies with the background technology of the patents heretofore incorporated by reference. These bulletins also disclose the fluid thrust balancing mechanism used in some of the immersed rotor pumps, but this feature does not constitute a part of the present invention. All this material is disclosed to show the concept of a pump to which the present invention is directed and use of axially spaced conical bearings for supporting the immersed rotor of such pump.

BACKGROUND OF INVENTION

The immersed rotor type of rotary pump which has proven to be the most successful through the years includes axially spaced conical bearings. The conical bearings have a journal element that is self lubricating carbon graphite with an internal taper and mounted for axial movement in the pump housing. The internal taper or conical bearing surface of the journal matches the taper or conical bearing surface of an element supported on the shaft of the immersed motor rotor. In this type of pump, stainless steel coil springs in the journal recess of the pump housing force the axially movable bearing elements or journals toward the fixed, matching elements on the rotor shaft. Thus, from both ends of the rotor a coil spring biases the two journal elements of the spaced conical bearings into engagement with the shaft elements to provide a bearing force that maintains the radial position of the rotating rotor. In addition, the conical bearings have a force component that maintains the axial position of the rotor within the pump housing. Consequently, the conical bearings which have been used for decades are quite successful and constitutes an inexpensive mechanism to maintain self-centering of the rotor for control of both the radial and axial positions of the rotating components of the rotary pump. During normal bearing wear, the conical bearings maintain the radial position of the rotating components of the pump. In addition, one of the beneficial features of using conical bearings is that the bearings have a self-centering ability in a axial direction based upon the liquid pressure around the rotor. The thrust balancing feature uses the pressure differential between the front of the rotor and the back of the rotor so that the hydraulic forces move the conical bearings slightly to center the rotor. This balancing is accommodated by spring biased conical bearings.

The conical bearings that are spring biased have an initial axial position after thrust balance, which position should be maintained over long term use of the pump. When the conical bearings have reached approximately $\frac{1}{8}$ inch of wear, it is desirable to replace or repair the journals of the pump to maintain trouble free operation. Wear of the conical bearings is normally discovered during regular inspection involving disassembly of the pump. However, it is desirable to know the extent of bearing wear for the purpose of tending to proper preventive maintenance. At this time, rotary pumps of the immersed rotor type are subject to periodic maintenance or inspection. The time between such inspections must be quite short to assure that maintenance is performed before the pump fails due to bearing wear. Catastrophic bearing failure must be avoided. Bearing wear can be accelerated by the type of liquid being pumped or contaminants. Consequently, it is preferred practice to inspect the conical bearings long before they need to be refurbished to assure long term operation of the pump. These factors make maintenance of the conical bearings a relatively costly and time consuming activity.

THE INVENTION

The present invention relates to the concept of monitoring wear of the conical bearings to determine when they should be replaced and/or refurbished. Consequently, frequent inspection of the bearings is not necessary. Bearings are given attention only when actually needed. This is a substantial advantage, is cost effective and prevents catastrophic failure based upon bearing malfunction. In the past, such failure could occur between even short term inspections. The invention involves an improvement in a rotary pump of the type described and incorporated by reference herein. Real time monitoring of conical bearing wear is the result of using the invention. A wear monitoring device using a magnetic mechanism is associated with each of the axially spaced conical bearings. A simple base line position is set during initial installation or start-up of the rotary pump. This base line compensates for assembly tolerances associated with bearing spacing. After initial set-up, the monitoring device is periodically inspected to reveal when the conical bearings need to be inspected or replaced. The magnetic device is installed on the motor housing at a position dictated by the location of the conical bearings. A magnet is implanted in each spring biased, axially movable journal of the pair of conical bearings. During operation of the pump, the conical bearings and the rotor assembly move axially to maintain the hydraulic thrust balance as previously described. In this instance, the magnets on the bearings move in the same direction and retain a balanced condition. As the conical bearings wear, the magnets in the bearing journals move toward each other as the journals move toward each other. The actual positions of the journal magnets are monitored by using the present invention. When there is a given distance of inward movement, in practice, ⅛ inch, a visual indication is outputted for the purpose of inspection and replacement of the worn bearings. Thus, the present invention gives an indication of when bearing wear is a given amount. This change in spacing of the bearing journals is indicative of the need to replace the bearings or otherwise attend to the bearings in the pump. The wear monitoring device of the present invention allows axial movement of the conical bearings in unison in a given direction while being able to detect wear as the journals move in opposite directions. The device is easily installed on existing canned pump designs. There is no need to modify the pump pressure boundary or to disturb the integrity of zero leakage design. By merely assembling a wear detector element in the housing of the pump adjacent each of the conical bearings, the wear characteristics of the bearings is monitored by using the present invention.

The invention is used in combination with a rotary pump of the type including a housing, an impeller rotatably mounted in the housing by a shaft carrying a motor rotor, and a motor stator fixed in the housing and surrounding the rotor to rotate the rotor and shaft about an axis. The shaft is mounted in the housing by axially spaced conical bearings, each of which includes a first element fixed on the shaft with a first conical bearing surface concentric with the axis of the shaft and a second element or journal carried by the housing, with the second conical bearing surface of the journal concentric also with the axis of the shaft. The two conical bearing surfaces engage each other to center the shaft for rotation in the stator. Biasing elements in the form of coil springs in the housing recess carrying the journals force the journals toward each other in an axial direction to compensate the wear between the surfaces. The journals are cylindrical in cross section and reciprocate in the recesses or chambers of the pump housing in only the axial direction. In accordance with the invention, a novel wear indicator mechanism is provided for this type of rotary pump. The wear indicator mechanism includes a first permanent magnet in the journal of one bearing and a second permanent magnet on the journal of the second bearing. A first follower mounted on the pump housing has a third permanent magnet facing the first magnet on one of the bearing journals. This follower is movable as the bearing on the journal shifts axially. A second follower is mounted on the pump housing with a fourth permanent magnet facing the second permanent magnet on the second journal and is movable by axial movement of the second permanent magnet on the second journal. Each of the followers has an indicator element movable into a position indicating the moved axial position of the first and second permanent magnets. The monitor device or mechanism measures the position of permanent magnets or the journal to indicate wear of the conical bearings.

In accordance with a further aspect of the invention, each of the magnet followers is a pendulum pivotally mounted about an axis generally perpendicular to the axis of the shaft. The pendulum has a first end carrying the magnet that follows the magnet on the journal and a second end that constitutes an indicator element for the follower. By using a pendulum mechanism, the two pendulums can be interconnected in a manner where shifting of the magnets in the same direction for fluid thrust balance does not improperly register wear However, when wear occurs, the pendulums are moved by the journal magnets in opposite directions. The amount of movement together indicates the extent of the bearing wear. By using the pendulum mechanism of the present invention, the wear indicator mechanism is allowed to compensate for axial movement in the same direction for thrust balancing of the pump. Some pumps do not have such fluid thrust balancing, but the wear indicator is equally applicable for use in such pumps. By using the novel pendulum arrangement, movement of the journals for the conical bearings together for thrust balancing does not indicate wear. An indication of wear only occurs when the bearings on the journals move in opposite directions as is the situation when there is actual bearing wear.

In accordance with another aspect of the present invention, the first and second followers are mounted in a tubular non-magnetic housing having a lower wall between the magnets in the journals and the magnets on the ends of the followers. In such tubular housings, there is provided an upper viewing opening exposing the indicator element of the followers to visually reveal actual movement of the bearing journals.

In accordance with an aspect of the invention, there is provided a detector switch carried by one of the followers, which switch is activated to provide an alarm when the two followers are shifted to a position indicative of the inward axial movement of the bearing journals a given distance requiring bearing maintenance or replacement.

The primary object of the present invention is the provision of a mechanism for monitoring the actual wear of the two axially spaced conical bearings of an immersed rotor type fluid pump.

Another object of the present invention is the provision of a rotary pump including a mechanism as defined above, which mechanism can compensate for fluid thrust balance in pumps having this operating feature.

Yet another object of the present invention is the provision of a pump having a mechanism as defined above, which mechanism includes two spaced pendulums that are pivoted about axes perpendicular to the rotor shaft, with the pendulums being interconnected in a manner that movement of the conical bearing journals in the same direction does not indicate wear, but in the opposite direction indicates bearing wear.

Still a further object of the present invention is the provision of a mechanism, as defined above, which mechanism reads movement of the journals for the axially spaced conical bearings as they move toward each other indicating wear of the bearing journals.

Still a further object of the present invention is the provision of a mechanism, as defined above, which mechanism includes a switch and alarm circuit to create an alarm signal when the mechanism senses a preselected amount of wear between the conical bearings.

These and other objects and advantages will become apparent from the following description taken together with the accompanying drawings.

PREFERRED EMBODIMENT

Figure 1:
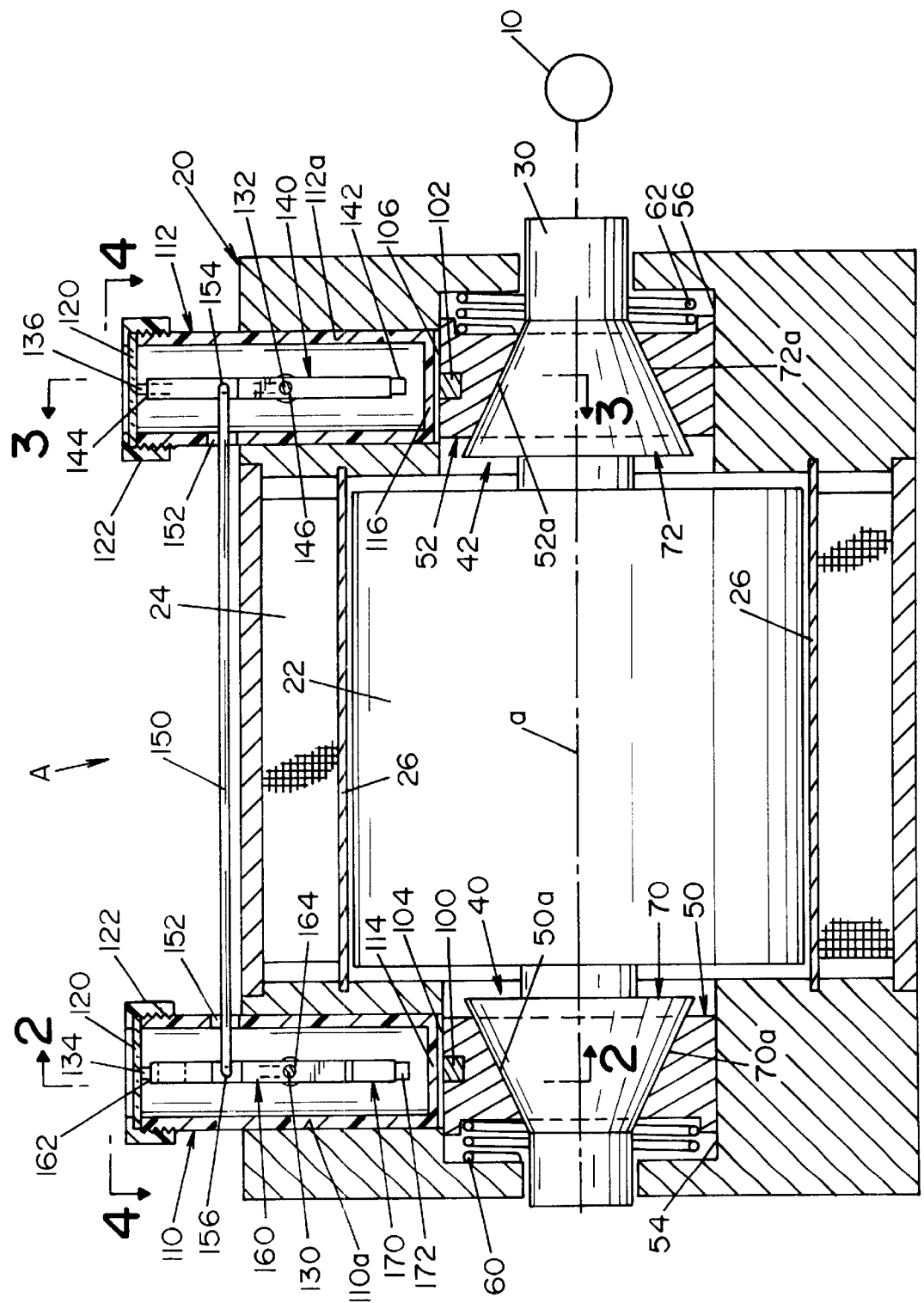
FIG. 1 is a cross-sectional view of the motor section of the rotary pump of the type disclosed in the patents incorporated by reference herein with the other pump components schematically represented.

Referring now to the drawings wherein the showings are for the purpose of illustrating the preferred embodiment of the invention only and not for the purpose of limiting same, FIG. 1 shows a pump A with the impeller and other pump components represented by element 10. These components are shown in the material incorporated by reference and are not needed to understand the invention. For the purposes of explaining the present invention, only the motor section of the pump is shown in the figures. Pump A includes a housing 20 with a motor rotor 22 and a motor stator 24 separated by a jacket or can 26, so that the rotor 22 is immersed in liquid as described in the prior art incorporated by reference herein. Pump shaft 30 is rotatably mounted about axis a and is held in the axial position by conical bearings 40, 42 that self-center shaft 30 and rotor 22 carried by the bearings. In accordance with standard practice, the conical bearings include generally square outer replaceable journals 50, 52 made from carbon graphite or other wear resistant and low friction material. These journals include conical bearing surfaces 50a, 52a, respectively and they are movable axially in generally cylindrical housing recesses 54, 56, respectively. Journals 50, 52 are biased together by stainless steel coil springs 60, 62 acting against the shaft mounted elements 70, 72 having conical bearing surfaces 70a, 72a, respectively. The hardened metal bearing surfaces fixed on the shaft are engaged by the low friction conical surfaces of journals 50, 52 to center the rotor 22 inside motor stator 24 for driving the pump components represented by element 10 in accordance with standard practice. Although not a part of the present invention, shaft 30 can include a thrust balancing mechanism whereby the shaft is moved axially according to the pressure differential on opposite ends of rotor 22 created during the pumping action. This feature used on many pumps is not a part of the invention although the wear detectors are designed to compensate for axial adjustment for a rotor of a pump having a thrust balancing feature. As so far described, pump A is a standard pump show in the patents incorporated by reference and bulletins incorporated by reference. The only detail of the standard pump necessary to understand the present invention is the fact that there are two axially spaced conical bearings 40, 42 which are forced inwardly to center the rotor. Such bearings wear and need to be replaced periodically. The present invention is directed to a mechanism for monitoring such bearing wear to indicate when the bearings must be replaced or otherwise maintained.

In accordance with the present invention, journals 50, 52 include permanent magnets 100, 102 implanted in the upper flat walls 104, 106, respectively. Mechanisms in housings 110, 112 follow the axial position of magnets 100, 102. If the magnets move in the same direction there is no indication of wear. This movement occurs when there is fluid thrust balancing of the rotor. The invention compensates for this feature of a pump, but such compensation is not a primary part of the present invention. The invention relates to detecting wear of journals 50, 52. Such wear causes the two journals to move axially toward each other. When the journals move together a given distance, in practice ⅛ inch, it is necessary to replace the journals or otherwise maintain pump A.

The present invention includes two follower mechanisms in non-magnetic or plastic tubular housings 110, 112. Housings 110, 112 are easily mounted in the pump housing 20 by bores 110a, 112a, respectively, that are drilled into the housing at position to intercept the upper walls 104, 106 of journals 50, 52. These bores are directly aligned with magnets 100, 102. Bottom walls 114, 116 are relatively thin to allow penetration of the flux from the magnets 100, 102. An upper window or lens 120 for each of the housings is held in place by circular cap 122. In this manner, the maintenance personnel can visually inspect the mechanism within housings 110, 112 for purposes to be described later. The housings include pivot pins 130, 132 moved downwardly through diametrically spaced slots 134 in housing 110 and similar slots 136 in housing 112. Pins 130, 132 pivotally mount the pendulum followers as will be described. The first follower is pendulum 140 having a bore 146 to pivotally mount on pin 132 in housing 112. The bottom of the pendulum includes a follower magnet 142. The upper end of the pendulum is an indicator element 144 so that pivoting movement about pin 132 is visible through lens 120 as magnet 102 shifts axially in recess 56. Magnet 142 with an opposite polarity pole faces magnet 102 so it will be attracted to and move with the journal magnet. Thus, the angular position of pendulum 140 is indicative of the axial position of magnet 102. In accordance with one aspect of the invention, the single pendulum will be indicative of wear by indicating the position of magnet 102. A maintenance person can merely inspect the upper indicator element 144 and determine the position of magnet 102. However, such change in position could be due to thrust balancing if such a feature is incorporated in pump A. For that reason, the preferred embodiment of the present invention includes two followers.

Figure 2:
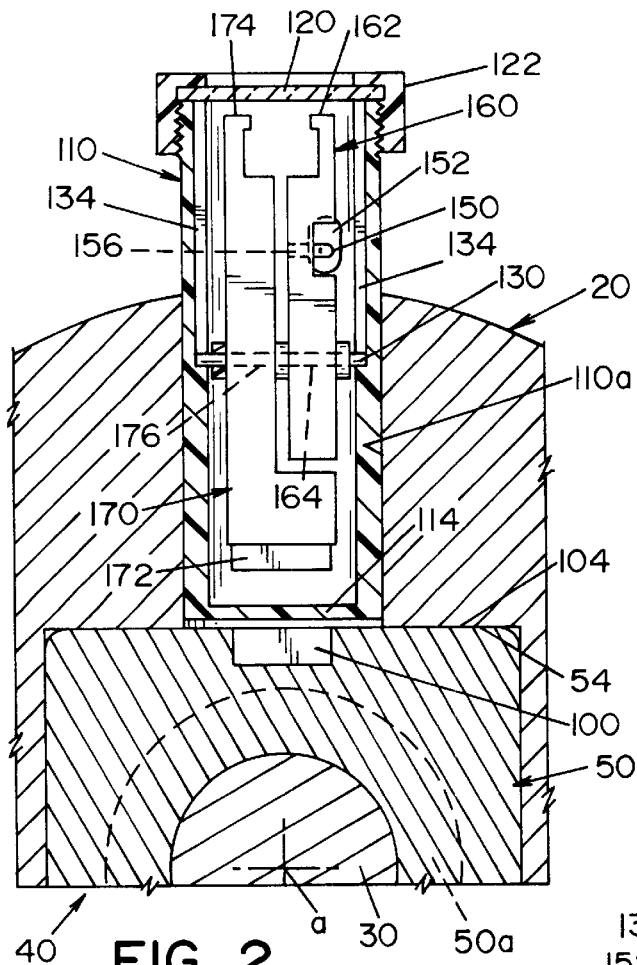
FIG. 2 is an enlarged cross-sectional view taken generally along line 2—2 of FIG. 1.
Figure 3:
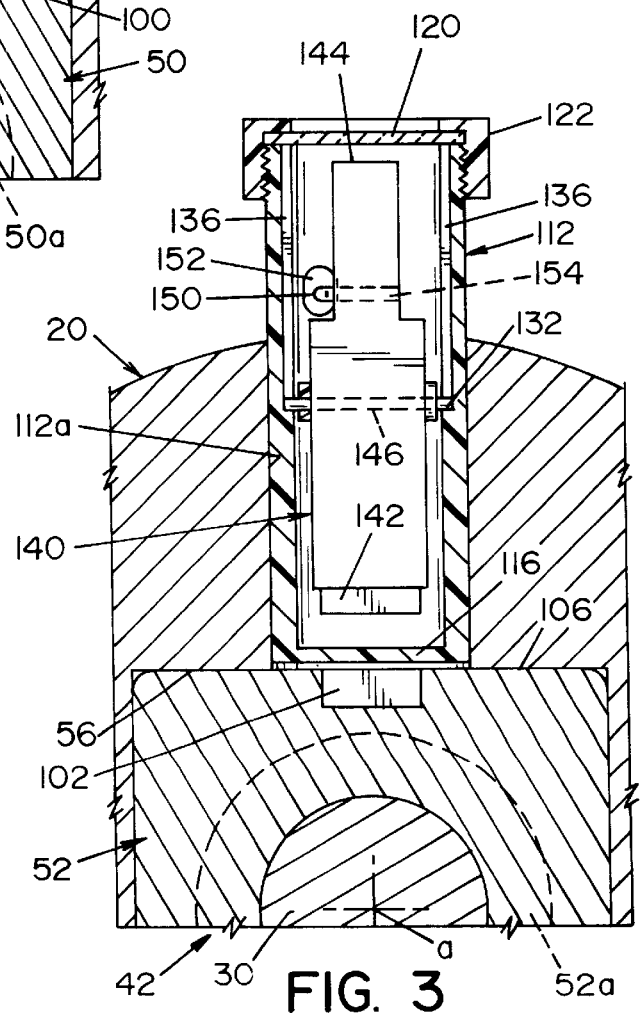
FIG. 3 is an enlarged cross-sectional view taken generally along line 3—3 of FIG. 1.
Figure 4:
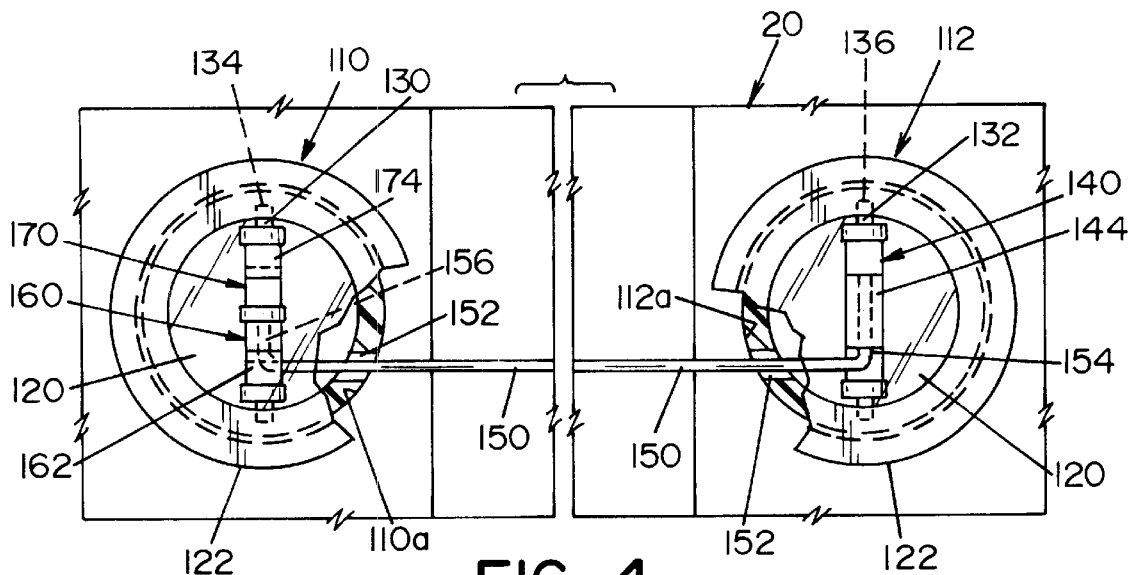
FIG. 4 is a top partial view taken generally along line 4—4 of FIG. 1.

Follower pendulum 140 includes a rod or link 150 extending through an opening or tube 152 and includes a bent end 154 rotatably mounted in pendulum 140 at a given distance above pin 132. This distance is selected so movement of rod 150 is coordinated with movement of magnet 142 as it follows journal magnet 102. Rod or link 150 extends from housing 112 to the opposite housing 110. Housing 10 also has an opening or tube 152 through which rod or link 150 extends. Bent end 156 is rotatably mounted in a pivoted indicator lever 160 with an outwardly extending upper indicator element 162. As so far described, pivotal movement of follower 140 by movement of magnet 102 shifts upper indicator element 144 as viewed through lens or window 120. At the same time, rod 150 shifts lever 160 with indicator element 162 to be viewed through window or lens 120 of housing 110. Both of these movements are in the same direction and the amount of movement of element 162 is controlled by the spacing of pivot bent end 154 from pivot 132 of pendulum 140. Turning now to housing 110, lever 160 has a pivot bore 164, best show in FIG. 1 at pin 130. This same pin pivotally mounts the second follower pendulum 170 having a bottom follower magnet 172 and an upper indicator element 174. Pivot bore 176 of pendulum 170 corresponds to pivot bore 164 of element 160. They both pivot on pin 130. Pins 130, 132 provide pivoting movement for pendulums 140, 170 about an axis generally perpendicular to axis a as best shown in FIGS. 2 and 3. Pendulum 170 pivots according to the position of magnet 100 in journal 50. Element 160 pivots about pin 130 an amount generally controlled by the position of spaced magnet 102 in journal 52. Consequently, the swinging action of element 160 and pendulum 170 is in opposite directions when the two magnets move together. The spacing between upper indicator elements 162, 174 indicates the amount of bearing wear. Consequently, a maintenance person merely views the spacing between elements 162, 174 to determine the amount of wear of journals 50, 52. As previously described, thrust balancing moves the two magnets in the same direction and thus elements 162,174 move together and are not separated to indicate wear. The amount of separation indicates the amount of bearing wear. The upper end of pendulum 140 is also indicative of wear. In accordance with the less precise embodiment of the present invention, single pendulum 140 can be employed in one or both housings 110, 112.

Figure 6:
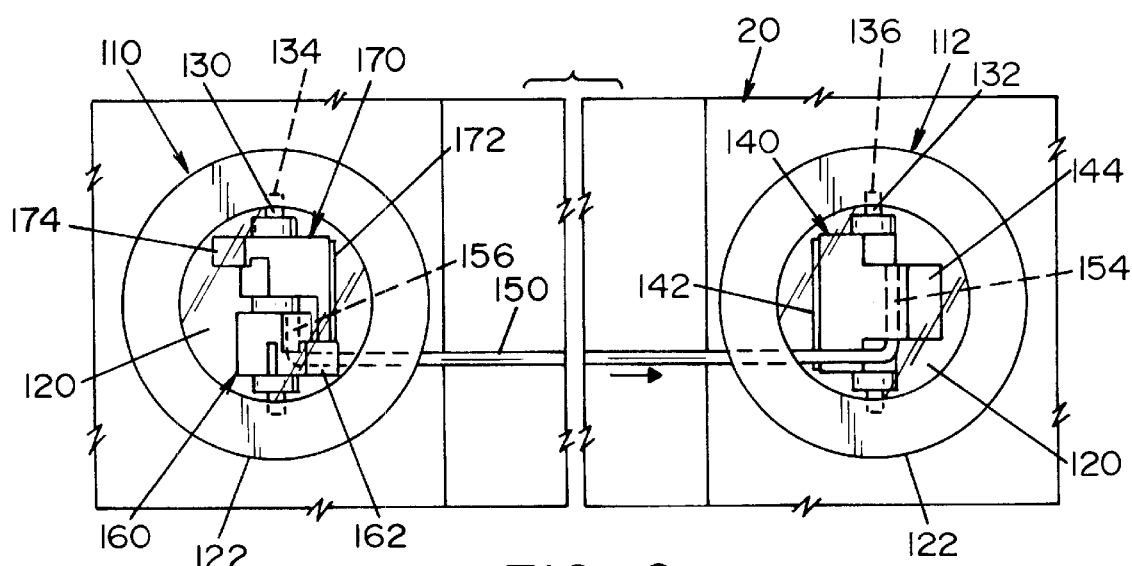
FIG. 6 is a view similar to FIG. 4 taken generally along line 6—6 of FIG. 5.
Figure 5:
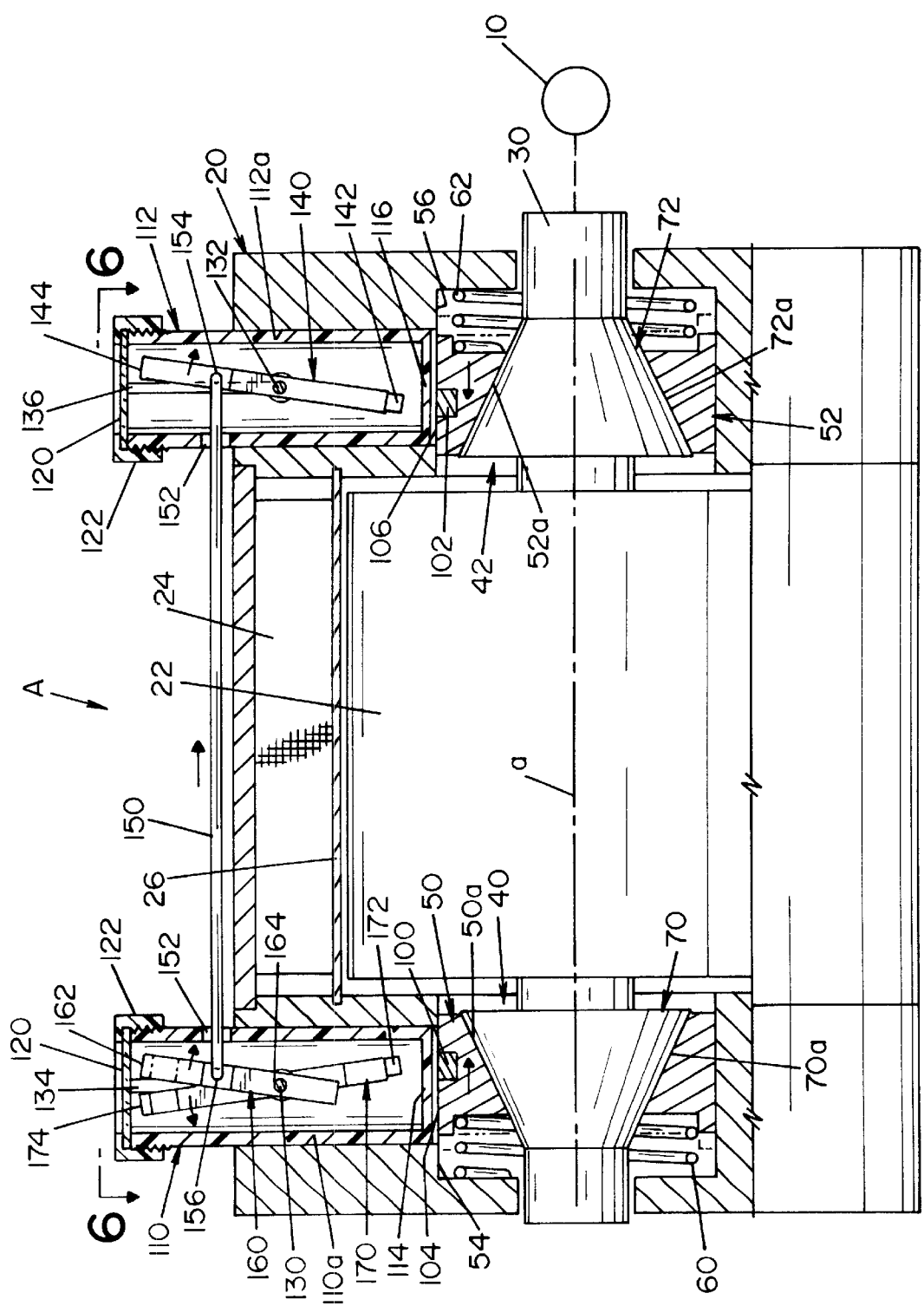
FIG. 5 is a view similar to FIG. 1 showing operation of the invention when there is substantial wear of the bearing journals.

Referring now to FIGS. 5 and 6, magnets 100, 102 have moved together due to wear of journals 50, 52. Thus, magnets 142, 172 are moved together causing pendulums 140, 170 to pivot toward each other. This draws pivot lever 160 clockwise as pendulum 170 is pivoted counterclockwise. Spacing between indicator elements 162, 174 is viewed through lens 120 and reveals that substantial wear has occurred. A maintenance person glancing through window or lens 120 knows that the pump needs attention in the area of its conical bearings. Thus, maintenance of pump A is based upon actual wear as opposed to some fictitious time schedule which must involve frequent inspections to assure no catastrophic failure of the bearings. As shown in FIG. 6, indicator elements 162, 174 are spaced away from each other. Of course, the window could have calibrations or indicia predicated on the wear amount requiring maintenance. In practice, the dual pendulum wear indicating mechanism or wear monitor is the preferred embodiment even though a single pendulum is used in some pumps.

Figure 7:
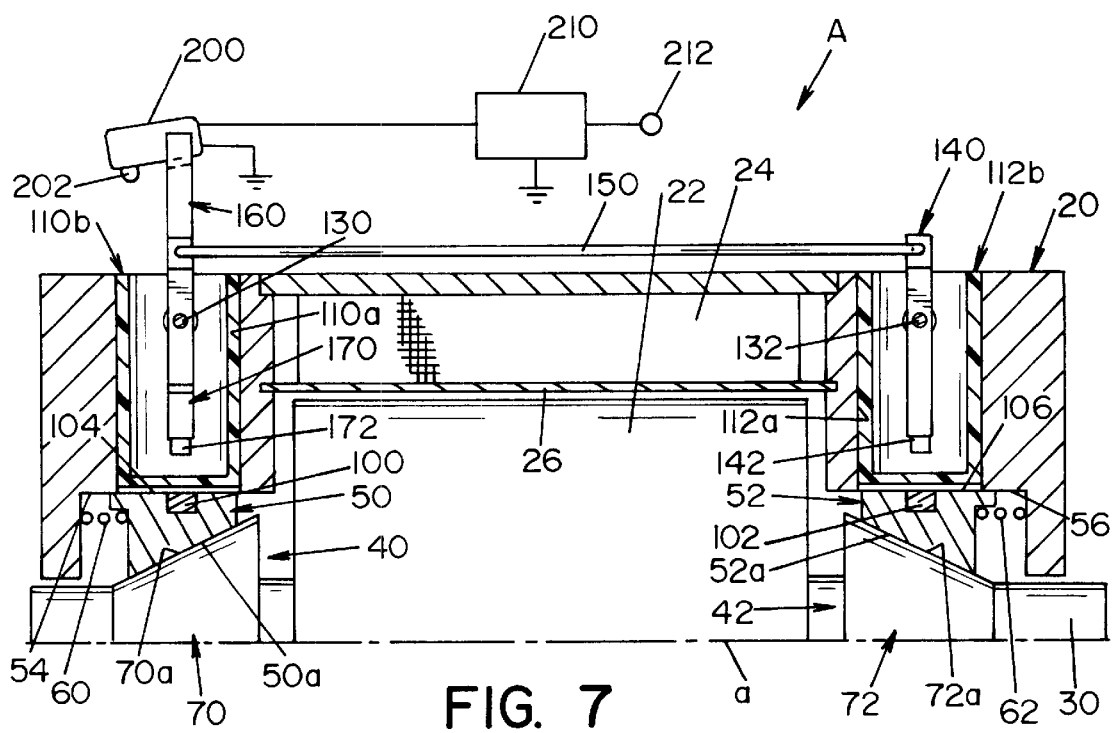
FIG. 7 is a partial view similar to FIG. 4 showing an alarm circuit used in accordance with another aspect of the present invention; and, FIG. 8 is a view similar to FIG. 7 illustrating the alarm circuit in the activated condition.
Figure 8:
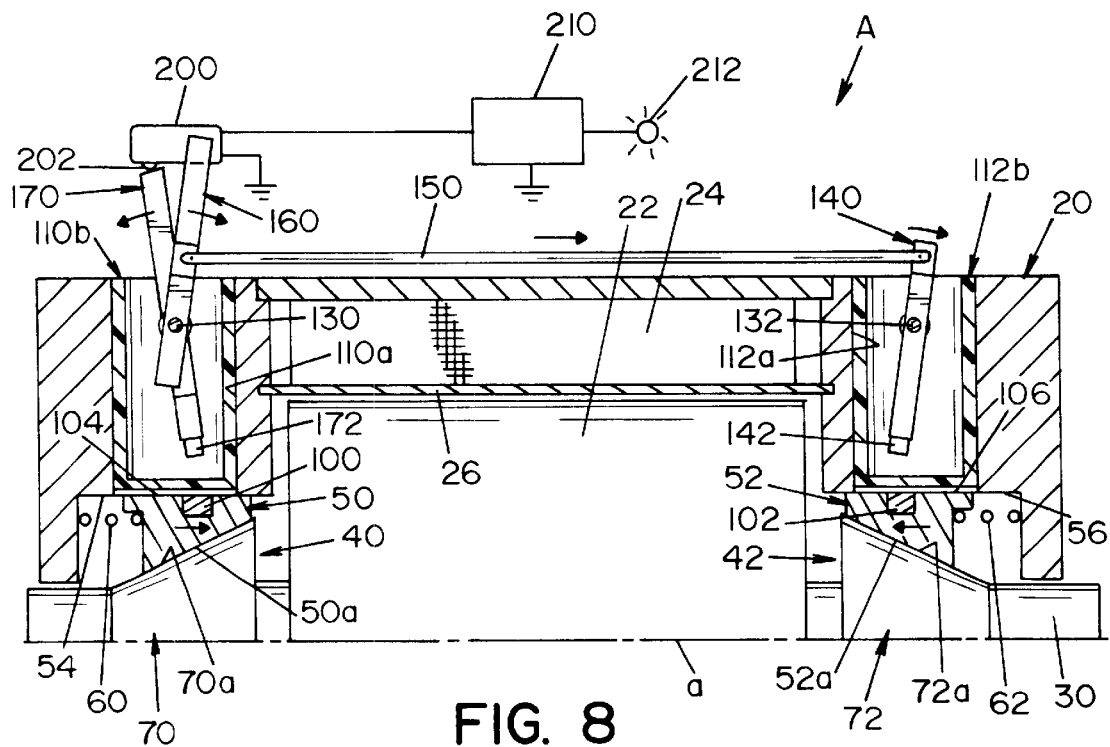

A modification of the present invention is illustrated in FIGS. 7 and 8 wherein the housings 110, 112 are cut away and indicated by opened housings 110b, 112b. Opening of housing 110b allows micro switch 200 with actuator 202 to be mounted on lever 160 or pendulum 170. The other component engages actuator 202 when the spacing between the two components reaches a predetermined amount, selected as the desired wear movement for magnets 100, 102. Upon closing of actuator 202, an alarm circuit 210 is energized to activate alarm 212, illustrated as a light. Of course, the alarm could be a light, a computer flag and/or sound alarm. FIG. 7 illustrates the desired starting position of switch 210. When magnets 100, 102 move together sufficient to indicate the desired maximum wear, lever 160 and pendulum 170 assume the position shown in FIG. 8 causing circuit 210 to activate alarm 212.

The invention has been illustrated with only the motor section of the pump and not illustrating the thrust balancing feature associated with several rotor pumps of the immersed rotor type to which the present invention is particularly directed. The invention relates only to wear detection; however, it has been explained that fluid thrust balancing during pump operation does not affect the wear monitoring aspect of the present invention. Other followers can be used for moving toward each other when journal mounted bearings 100, 102 move together to indicate wear. The use of the dual pendulum mechanism is preferred.

Having thus defined the invention, the follow is claimed:

1. A rotary pump for liquid comprising: a housing, a shaft carrying a motor rotor, a motor stator fixed in said housing and surrounding said rotor to rotate said rotor and shaft about an axis, said shaft being mounted in said housing by axially spaced conical bearings, each bearing including a first element fixed on said shaft with a first conical bearing surface concentric with said axis and a second element carried by said housing with a second conical bearing surface concentric with said axis and slidably engaging said first bearing surface, a biasing element forcing at least one of said second elements toward said other second element in an axial direction to compensate for wear between said surfaces, and a wear indicator comprising a first permanent magnet on said at least one second element, a movable follower mounted on said housing with a second permanent magnet facing said first permanent magnet and movable by said first permanent magnet, said follower having an indicator element movable into a position indicating the axial position of said second permanent magnet.

2. A rotary pump as defined in claim 1 wherein said follower is a pendulum pivotally mounted on an axis generally perpendicular to said shaft axis with a first and second end, said first end carrying said second magnet and said indicator element being on the second end of said pendulum.

3. A rotary pump as defined in claim 2 wherein said follower is mounted in a tubular non-magnetic housing with a lower wall between said first and second magnets.

4. A rotary pump as defined in claim 3 wherein said tubular housing includes an outwardly extending vision opening and said indicator element is visible through said opening.

5. A rotary pump as defined in claim 1 wherein said follower is mounted in a tubular non-magnetic housing with a lower wall between said first and second magnets.

6. A rotary pump as defined in claim 5 wherein said tubular housing includes an outwardly extending vision opening and said indicator element is visible through said opening.

7. A rotary pump as defined in claim 1 including a third permanent magnet on said other second element, a second movable follower mounted on said housing with a fourth permanent magnet facing said third permanent magnet and movable by said fourth permanent magnet, said second follower having an indicator element movable into a position indicative of the axial position of said third permanent magnet.

8. A rotary pump as defined in claim 7 including a comparator linkage between said first mentioned follower and said second follower to position two elements that totalize the movement of said two followers to read the combined movement of said second and fourth magnets toward each other.

9. A rotary pump as defined in claim 8 comprising a viewing opening to view said combined movement.

10. A rotary pump as defined in claim 8 comprising a detector switch carried by one of said followers and actuated by the other of said followers when said combined movement reaches a given distance.

11. A rotary pump as defined in claim 10 including an alarm device and a circuit to activate said alarm device when said switch is activated.

12. A rotary pump as defined in claim 11 wherein said given distance is about ⅛ inch.

13. A rotary pump as defined in claim 10 wherein said given distance is about ⅛ inch.

14. A rotary pump for liquid comprising: a housing, a shaft carrying a motor rotor, a motor stator fixed in said housing and surrounding said rotor to rotate said rotor and shaft about an axis, said shaft being mounted in said housing by axially spaced conical bearings, each bearing including a first element fixed on said shaft with a first conical bearing surface concentric with said axis and a second element carried by said housing with a second conical bearing surface concentric with said axis and slidably engaging said first bearing surface, a biasing element forcing said second elements toward each other in an axial direction to compensate for wear between said surfaces, a wear indicator comprising a first permanent magnet on the first of said second elements, a second permanent magnet on the second of said second elements, a first follower mounted on said housing with a third permanent magnet facing said first permanent magnet and movable by said first permanent magnet, a second follower mounted on said housing with a fourth permanent magnet facing said second permanent magnet and movable by said second permanent magnet, each of said followers having indicator elements movable into a position indicating the axial positions of said first and second permanent magnets.

15. A rotary pump as defined in claim 14 wherein each of said followers is a pendulum pivoted about an axis generally perpendicular to said shaft, said pendulums having a first end carrying said magnet and a second end being said indicator element of said follower.

16. A rotary pump as defined in claim 15 wherein the second end of the first of said pendulums connected to a secondary lever pivotally mounted on the axis of the second of said pendulums by an axially extending link, said pivoted lever having a secondary indicator element movably said first pendulum through said link, whereby the relative positions of said indicator element of said second pendulum and said secondary indicator element is indicative of the positions of said first and second magnets on said second elements of said conical bearings.

17. A rotary pump as defined in claim 16 wherein said second follower is mounted in a tubular non-magnetic housing with a lower wall between said second and fourth permanent magnets and an upper viewing opening exposing said indicated element of said second pendulum and said secondary indicator element.

18. A rotary pump as defined in claim 16 including a detector switch carried by either said indicator element of said second pendulum or said secondary indicator element, said switch being activated by the other of said two mentioned elements when the combined movement of said second elements of said conical bearing reaches a given distance.

19. A rotary pump as defined in claim 18 including an alarm device and a circuit to activate said alarm device when said switch is activated.

20. A rotary pump as defined in claim 19 wherein said given distance is about ⅛ inch.

21. A rotary pump as defined in claim 18 wherein said given distance is about ⅛ inch.

22. A rotary pump for liquid comprising: a housing, a shaft carrying a motor rotor, a motor stator fixed in said housing and surrounding said rotor to rotate said rotor and shaft about an axis, said shaft being mounted in said housing by axially spaced conical bearings, each bearing including a first element fixed on said shaft with a first conical bearing surface concentric with said axis and a second element carried by said housing with a second conical bearing surface concentric with said axis and slidably engaging said first bearing surface, a biasing element forcing at least one of said second elements toward said other second element in an axial direction to compensate for wear between said surfaces, a wear indicator comprising a first follower on said housing and movable axially with said second element of said first conical bearing, a second follower on said housing and movable axially with said second element of said second conical bearing with the spacing between said followers having indicator elements spaced from each other a spacing indicative of the total axial movement of said second bearing elements and a view window on said housing for viewing said spacing of said indicator elements.

23. A rotary pump as defined in claim 22 wherein each of said followers includes a permanent magnet movable with a permanent magnet on one of said second bearing elements.

* * * * *